United States Patent [19]

Hitomi et al.

[11] Patent Number: 5,203,311
[45] Date of Patent: Apr. 20, 1993

[54] EXHAUST GAS RECIRCULATION SYSTEM FOR AN INTERNAL COMBUSTION ENGINE

[75] Inventors: Mitsuo Hitomi; Toshihiko Hattori; Kenji Kashiyama; Junsou Sasaki; Kazuaki Umezawa; Tadayoshi Kaide; Noriyuki Iwata; Naoyuki Yamagata; Kazumasa Nomura, all of Hiroshima, Japan

[73] Assignee: Mazda Motor Corporation, Hiroshima, Japan

[21] Appl. No.: 788,128

[22] Filed: Nov. 5, 1991

[30] Foreign Application Priority Data

Nov. 6, 1990 [JP] Japan ................... 2-298918
Nov. 6, 1990 [JP] Japan ................... 2-298919
Nov. 6, 1990 [JP] Japan ................... 2-298920

[51] Int. Cl.⁵ .................................. F02M 25/07
[52] U.S. Cl. .................... 123/570; 123/571; 60/605.2
[58] Field of Search ............ 123/559.2, 568, 569, 123/570, 571; 60/605.2

[56] References Cited

U.S. PATENT DOCUMENTS

| | | | |
|---|---|---|---|
| 4,055,158 | 10/1977 | Marsee | 123/570 X |
| 4,134,377 | 1/1979 | Bamsey et al. | 123/570 |
| 4,147,141 | 4/1979 | Nagano | 123/570 |
| 4,234,040 | 11/1980 | Argyle et al. | 123/570 X |
| 4,291,760 | 9/1981 | Argvle et al. | 123/570 X |
| 4,357,917 | 11/1982 | Aoyama | 123/568 X |
| 4,426,848 | 1/1984 | Stachowicz | 60/605.2 |
| 4,700,684 | 10/1987 | Pischinger et al. | 123/568 |

FOREIGN PATENT DOCUMENTS

0176312 10/1982 Japan ................... 123/570
0048930 3/1987 Japan ................... 123/559.2

Primary Examiner—Willis R. Wolfe
Attorney, Agent, or Firm—Fish & Richardson

[57] ABSTRACT

Disclosed is an exhaust gas recirculation system for an engine having a high compression ratio or with a supercharger. An outside EGR duct connecting the exhaust system to the intake system is provided with a first control valve, which has a second outside EGR duct bypassing the first control valve. The second EGR duct has a second EGR control valve and a cooler. When the engine exists in an extremely low load state, the first and second control valves are closed to inhibit the outside EGR. In the light load state, the first control valve is opened while the second control valve is closed, thereby allowing recirculation of the EGR gases having high temperature and reducing the pumping loss In the high load state, the first control valve is being closed while opening the second control valve, thereby increasing a recirculation ratio of EGR gases cooled by the cooler and performing both an improvement of anti-knocking performance and a decrease in pumping loss, as well as reducing the heat load of the exhaust system and within the engine.

28 Claims, 9 Drawing Sheets

EXHAUST GAS RECIRCULATION SYSTEM FOR AN INTERNAL COMBUSTION ENGINE

BACKGROUND OF THE INVENTION

1. Field of the Invention

The present invention relates to an exhaust gas recirculation (EGR) system for an internal combustion engine and, more particularly, to an exhaust gas recirculation (EGR) system so adapted as to recirculate a portion of exhaust gases into an intake system of the internal combustion engine.

2. Description of Related Art

Internal combustion engines, particularly for automotive vehicles, are designed such that a portion of exhaust gases is recirculated into the intake system. In other words, for example, as shown in Japanese Patent Publication No. 160,052/1984, the internal combustion engines adopt a so-called EGR system that has been employed as measures against NOx (measures to curtail NOx as hazardous ingredients in exhaust gases) in a light load region.

As effective means for enhancing heat efficiency of the internal combustion engine, it is known to set a compression ratio of the internal combustion engine to a high value. A supercharged engine is further known, which has a supercharger mounted to an intake system of the internal combustion engine so as to produce a large output at a small displacement. For the internal combustion engines of the type having a high compression ratio or the supercharged engines, the problems exist, first, in the fact that knocking is likely to occur in a high load region and, secondly, in the fact that heat load within the internal combustion engine or within the exhaust system thereof increases in the high load region. These problems make it difficult to set a high compression ratio. This is particularly so for the supercharged engines.

SUMMARY OF THE INVENTION

The object of the present invention is to provide an exhaust gas recirculation (EGR) system for an internal combustion engine so adapted to improve anti-knocking performance in a high load driving region as well as to reduce a heat load of the exhaust system or within the internal combustion engine, when the compression ratio of the internal combustion engine is made high or when the internal combustion engine is provided with a supercharger.

In order to achieve the aforesaid object, the present invention consists of an exhaust gas recirculation system for the internal combustion engine connected to the exhaust system of the internal combustion engine and the intake system thereof as well as provided with an outside EGR duct for recirculating a part of exhaust gases into the intake system of the internal combustion engine, wherein the outside EGR duct is provided with an EGR cooler, or a heat exchanger.

This arrangement permits the EGR gases forcibly cooled by the EGR cooler to be recirculated into the intake system, thereby allowing the cooled EGR gases to lower combustion temperature. Hence, the recirculation of the cooled EGR gases into the intake system in the high load region can reduce NOx during the high load driving region by recirculating the cooled EGR gases to the intake system in the high load region, as well as the anti-knocking performance can be improved while reducing the heat load of the exhaust system or within the internal combustion engine. By applying the exhaust gas recirculation according to the present invention to the internal combustion engine having a high compression ratio or to the supercharged internal combustion engine, the heat load of the exhaust system or within the internal combustion engine can be reduced while improving the anti-knocking performance.

A plurality of pipes may be juxtaposed with each other, in place of the EGR cooler, thereby forming the outside EGR duct.

This arrangement can cool down the EGR gases during passage through the outside EGR duct and recirculate the cooled EGR gases in a manner similar to the EGR cooler.

Other objects, features and advantages of the present invention will become apparent in the course of the description of the preferred embodiments, which follows, with reference to the accompanying drawings.

BRIEF DESCRIPTION OF THE DRAWINGS

FIGS. 1 to 4 are directed to the first embodiment of the present invention, in which:

FIGS. 7 to 9 is directed to the fourth embodiment according to the present invention, in which:

FIGS. 10 and 11 are directed to the fifth embodiment according to the present invention; in which:

FIGS. 13 and 14 are directed to the seventh embodiment according to the present invention, in which:

DESCRIPTION OF THE PREFERRED EMBODIMENTS

The present invention will be described more in detail by way of examples with reference to the accompanying drawings.

FIRST EMBODIMENT (FIGS. 1 to 4)

Figure 1:
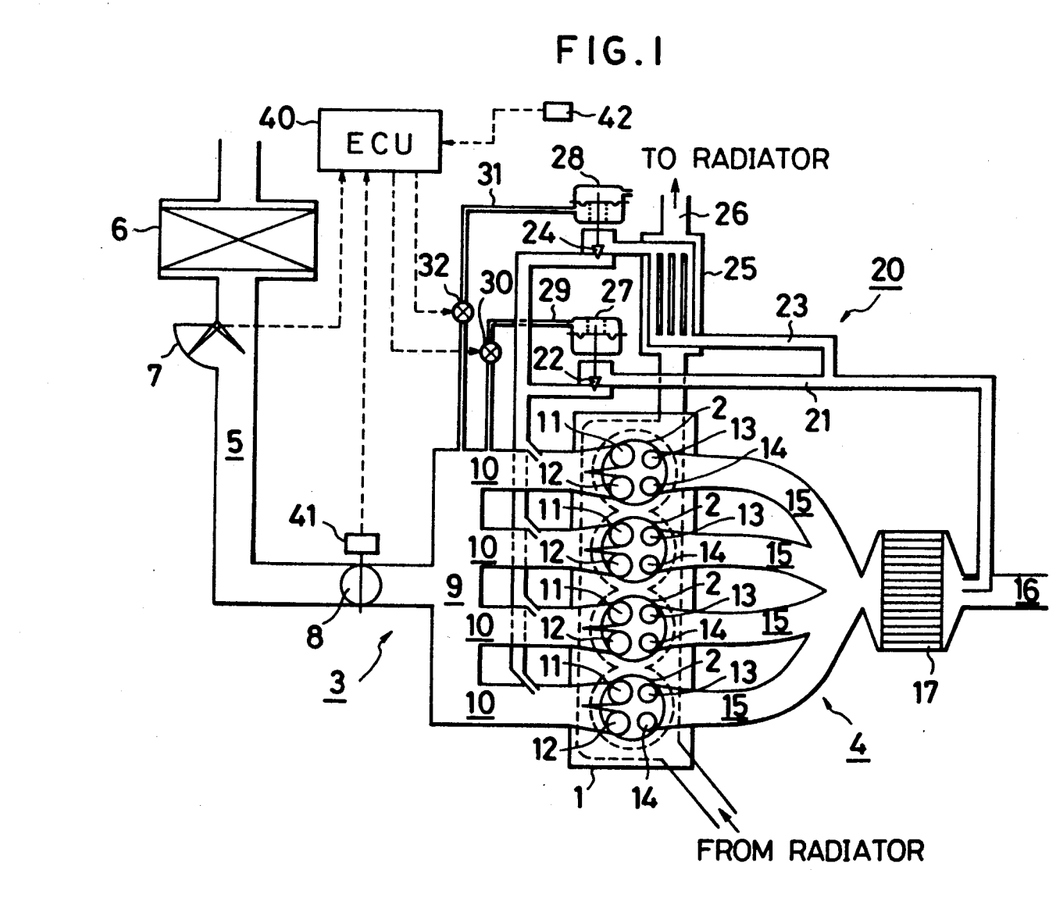
FIG. 1 is a schematic representation showing an outline of the internal combustion engine.

As shown in FIG. 1, reference numeral 1 denotes an engine body of the internal combustion engine, and the engine body 1 includes an in-line 4-cylinder engine of natural air intake type having four cylinders 2 disposed in a row. The internal combustion engine to be employed herein has a compression ratio of 12.5.

Reference numeral 3 stands for an intake system of the internal combustion engine and reference numeral 5 for a common intake passage. To the common intake passage 5 are disposed an air cleaner 6, an air flowmeter 7 for detecting a quantity of intake air, and a throttle valve 8 in this order from its upstream side to its downstream side. Connected to a downstream end of the common intake passage 5 is a surge tank 9 which in turn branches into four independent intake passages 10, and a downstream end portion of each of the independent intake passages 10 further branches into two intake ports 11 and 12 for respective cylinders 2.

On the other hand, each of the cylinders 2 has two exhaust ports 13 and 14, to each of which is connected the independent intake passage 15.

A downstream end of the independent intake passage 15 connected to each of the cylinders 2 is combined into a common exhaust passage 16 which in turn is provided with a catalyst converter 17.

Reference numeral 20 denotes an exhaust gas recirculation unit (an EGR unit) through which the intake system 3 is communicated with the exhaust system 4, thereby allowing a portion of exhaust gases to be recirculated into the intake system 3.

The EGR unit 20 has an EGR duct 21 disposed outside the engine body 1 of the internal combustion engine. One end of the EGR duct 21 is connected to an immediate downstream side of the catalyst converter 17 and the other end thereof is connected to the independent intake passage 10. Further, the EGR duct 21 has a first EGR control valve 22 disposed in its intermediate position.

Further, the EGR unit 20 has a second EGR duct 23 bypassing the first EGR control valve 22. The second EGR duct 23 has a second EGR control valve 24 and an EGR cooler 25. The EGR cooler 25 is of a water cooled type and is disposed in an intermediate position of a coolant passage 26 for cooling the internal combustion engine.

The first EGR control valve 22 is connected to a first actuator 27 of a diaphragm type, while the second EGR control valve 24 is connected to a second actuator 28 of a diaphragm type. A vacuum chamber of the first actuator 27 is communicated with the surge tank 9 through a first pressure pipe 29 which in turn is provided with a first solenoid valve 30 of an electromagnetic type. A vacuum chamber of the second actuator 28 is communicated with the surge tank 9 through a second pressure pipe 31 which in turn is provided with a second solenoid valve 32. The opening angles of the first and second solenoid valves 30 and 32 are controlled by a duty ratio.

The first EGR control valve 22 is opened when the first solenoid valve 30 is opened and the negative pressure is introduced into the first actuator 27. On the other hand, the second EGR control valve 24 is closed when the second solenoid valve 32 is opened and the negative pressure is introduced into the second actuator 28.

As shown in FIG. 1, reference numeral 40 denotes a control unit which is composed of, for example, a microcomputer with CPU, ROM, RAM, etc. built therein in conventional manner.

Entered into the control unit 40 are a signal indicative of a quantity of intake air from the air flowmeter 7 as well as signals from sensors 41 and 42. The sensor 41 is to sense an opening angle of the throttle valve 8, that is, a load. The sensor 42 is to sense the number of rotation of the engine.

Control signals are generated from the control unit 40 to the first solenoid valve 30 and the second solenoid valve 32, thereby controlling the opening angles of the first EGR control valve 22 and the second EGR control valve 24.

Figure 2:
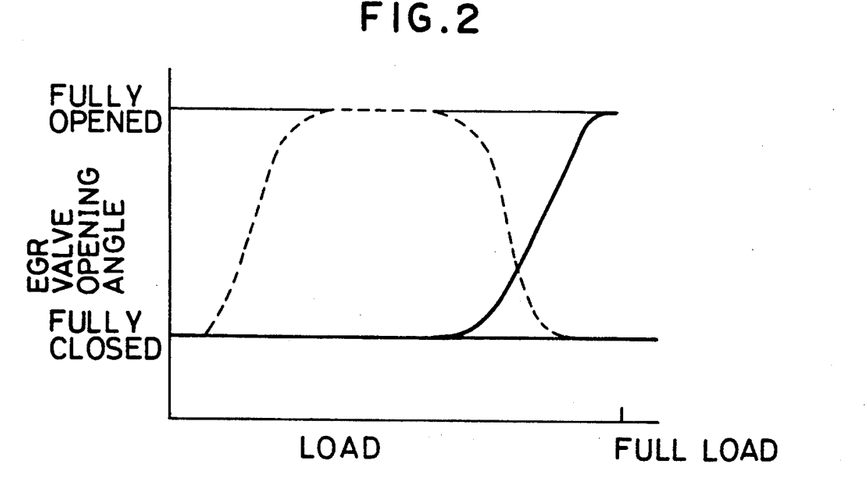
FIG. 2 is a graphic representation showing contents of control over the EGR system.

FIG. 2 shows the contents of the control of the first EGR control valve 22 and the second EGR control valve 24. In FIG. 2, the broken line represents the first EGR control valve 22, while the solid line represents the second EGR control valve 24.

As is apparent from FIG. 2, the first EGR control valve 22 and the second EGR control valve 24 are both closed in an extremely low load region. In other words, the outside exhaust gas recirculation (the outside EGR) through the first EGR duct 21 and the second EGR duct 23 is inhibited in the extremely low load region, thereby ensuring stability in combustion in this range.

On the other hand, in a light load region, the first EGR control valve 22 is fully opened while the second EGR control valve 24 is fully closed. In other words, the exhaust gas recirculation is implemented using the first EGR duct 21 in the light region where the problem with a pumping loss may arise. Since no EGR cooler is mounted to the first EGR duct 21, the EGR gases at relatively high temperature are recirculated into the intake system 3.

Figure 3:
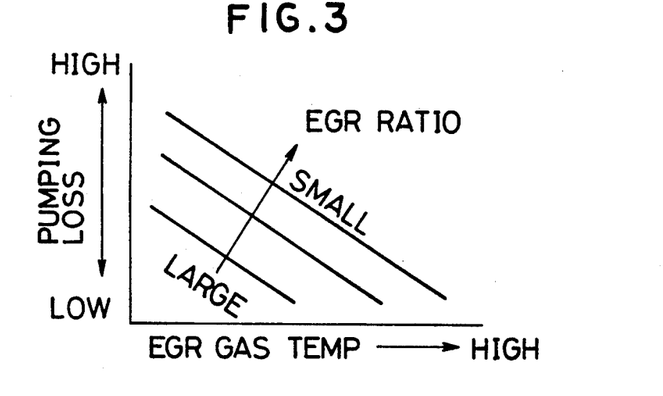
FIG. 3 is a graphic representation showing the relationship between the pumping loss and the temperature of EGR gases.

FIG. 3 is a graphical representation showing the relationship between the temperature of EGR gases and an extent to which the pumping loss is reduced, by using an EGR ratio as a parameter. As the extent of restriction of intake air by the throttle valve 8 is large in the light load region, the pumping loss becomes likely to occur at a higher rate. As is apparent from FIG. 3, however, the pumping loss can be reduced to a larger extent by a slight quantity of exhaust gas recirculation as the temperature of the EGR gases becomes higher. It is thus to be noted that it is desired to use the EGR gases at a higher temperature in the light load region.

As shown in FIG. 2, in the high load region, on the other hand, the opening angle of the first EGR control valve 22 is made smaller as the load becomes larger. Conversely, the opening angle of the second EGR control valve 24 is made larger. In other words, in the high load region, the rate of the EGR by using the first EGR duct 21 is made smaller while the rate of the EGR by using the second EGR duct 23 is made higher, as the load becomes higher. This means that the rate of recirculation of the EGR gases cooled by the EGR cooler 25 is increased to a larger extent as the load becomes larger.

Figure 4:
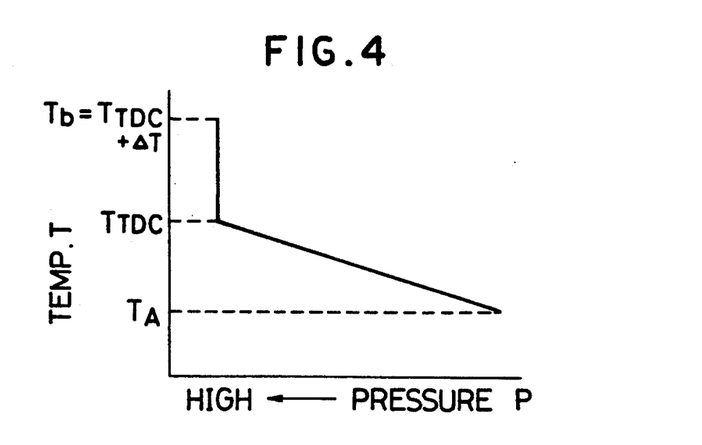
FIG. 4 is a graphic representation showing the cylinder pressure and the temperature of fuel in an equal volume cycle.

It is further to be noted that, as the temperature of the EGR gases is lower or as the quantity of the EGR gases is larger, the temperature of combustion becomes lower. FIG. 4 is a graph representation showing the relationship between the cylinder pressure P and the combustion temperature T. Reference symbols $T_A$, $T_{TDC}$, $\Delta T$ and $T_b$ are represented by the following formulas:

$$T_A = \frac{C_{pa}G_aT_a + C_{pe}G_eT_e}{C_{pa}T_a + C_{pe}T_e}$$

$$T_{TDC} = T_A \times \epsilon^{k-1}$$

$$\Delta T = \frac{Q}{C_v[G_a(1 + 1/AF) + G_e]}$$

-continued $$Tb = T_{TDC} + \Delta T$$

where
$T_A$ is the temperature at the moment of start of compression;
$T_{TDC}$ is the temperature of the top dead center of compression;
Tb is the temperature after combustion;
$\epsilon$ is an effective compression ratio;
Cp is an equal pressure specific heat;
Cv is an equal volume specific heat;
AF is an air-to-fuel ratio;
suffix a represents fresh air;
suffix e represents exhaust gases (EGR);
Q is the total calorific value,
$Q \infty Ga$ (constant AF); and
G is the gas weight.

As is apparent from the above formulas, the temperature of combustion becomes lower as the temperature of the EGR gases is made lower or as the quantity of the EGR gases is made larger. When the temperature of combustion is lowered, the temperature on the wall of the combustion chamber becomes lower, too, thereby reducing the heat load within the internal combustion engine. Further, the temperature of burned gases is so low in the course of combustion that the radiation heat against unburned gases is reduced and that the temperature of the unburned gases can be suppressed. Hence, the anti-knocking performance can be improved. Furthermore, the reduction in the temperature of combustion leads to the decrease in the temperature of the exhaust gases, so that it is advantageous from the heat-resistance point of view for parts of the exhaust system and the heat load of the exhaust system is made lower.

Hence, in the high load region, as the load is made greater, the adverse effect of the pumping loss becomes smaller, while the problems may arise with the heat load within the internal combustion engine, etc. In order to solve the aforesaid problems, the recirculation ratio of the EGR gases having relatively high temperature is reduced, while the recirculation ratio of the EGR gases having relatively low temperature is increased, as the load becomes larger.

In this embodiment, the inlet of the EGR gases, that is, a site connecting the EGR duct 21 to the exhaust system 4, is disposed on the downstream side of the catalyst converter 17, so that the exhaust gases are introduced into the EGR duct 21 after they have been cooled to some extent by the exhaust system 4. This arrangement enables the EGR gases cooled by the EGR cooler 25 to become lower in temperature, thereby improving the effects sought to be achieved in the high load region.

The EGR cooler 25 may be of an air cooled type as well as of a water cooled type. The duct length of the second EGR duct 23 may be prolonged to thereby cool the EGR gases during passage through the prolonged EGR duct 23, without disposition of the EGR cooler to the second EGR duct 23. Further, the EGR ducts 23 may be composed of plural ducts juxtaposed with each other, thereby cooling the EGR gases.

Figure 5:
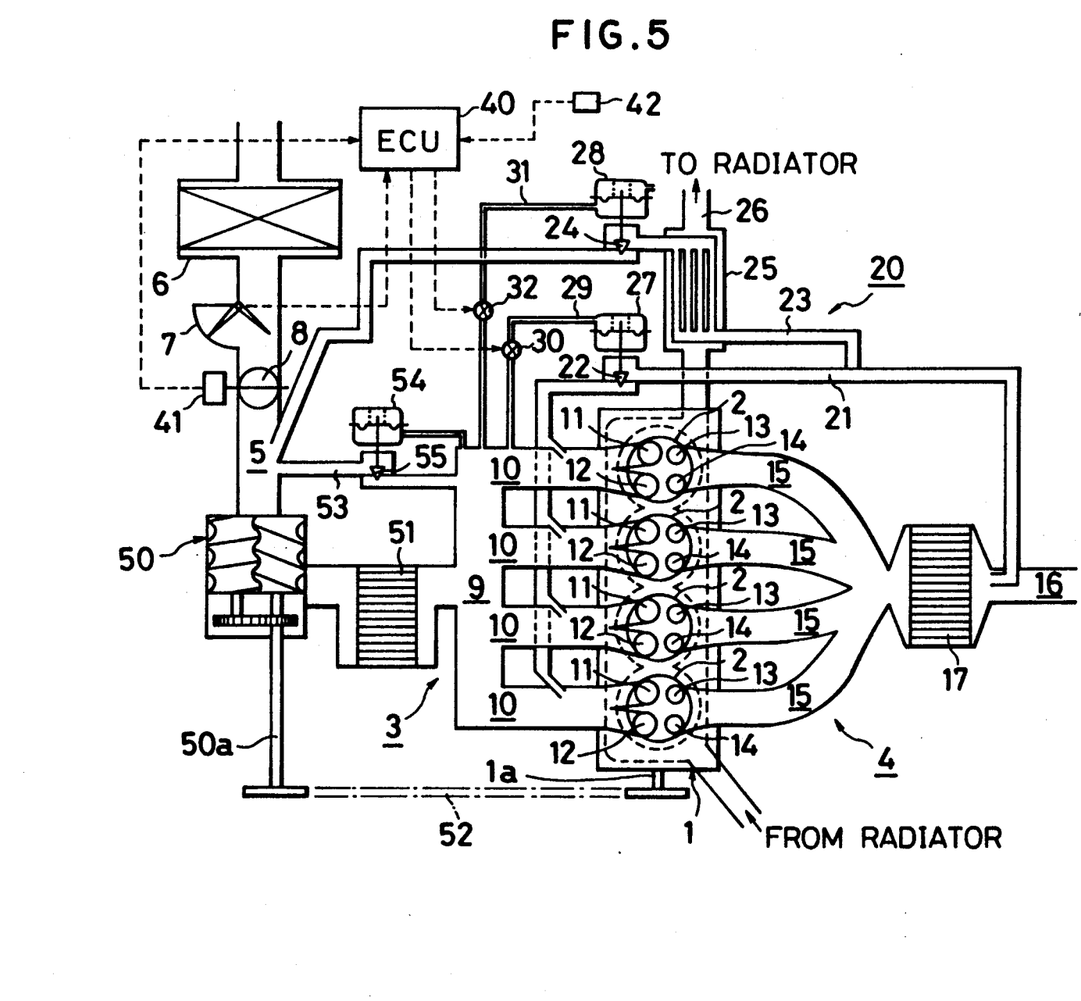
FIG. 5 is a schematic representation showing an outline of the internal combustion engine according to the second embodiment of the present invention.

FIGS. 5 et seq are directed to the other embodiments according to the present invention and, in those embodiments, the same parts or substantially the same parts are provided with the same reference numerals employed for the first embodiment as described hereinabove and description thereof will be omitted for brevity of explanation. The characteristic portion of the present invention will be described.

SECOND EMBODIMENT (FIG. 5)

This embodiment according to the present invention is directed to the supercharged internal combustion engine having a supercharger of a mechanical type, which has the compression ratio of 10. To this embodiment is applied the control of the exhaust gas recirculation as described hereinabove in the first embodiment.

In this embodiment, the common intake passage 5 of the intake system 3 is provided with a supercharger 50 on its upstream side and an inter cooler 51 on its downstream side. An input shaft 50a of the supercharger 50 is connected to an output shaft 1a of the internal combustion engine through a belt 52, and the supercharger 50 is driven by the engine output.

The intake system 3 has a bypass passage 53 bypassing the supercharger 50 and the inter cooler 51. The bypass passage 53 contains a relief valve 55 drivable by the actuator 54 of a diaphragm type. The pressure chamber of the actuator 54 is communicated with the surge tank 9 and the relief valve 55 is so disposed as to open the bypass passage 53 when the pressure becomes higher than a predetermined value.

The EGR unit 20 has the second EGR duct 23 connected to the common intake passage 5 interposed between the throttle valve 8 and the supercharger 50. The site where the second EGR duct 23 is connected may be the one interposed between the supercharger 50 and the inter cooler 51.

The first EGR control valve 22 is arranged to be opened when the first solenoid valve 30 is opened and the negative pressure is introduced into the first actuator 27, in the manner as in the first embodiment according to the present invention. On the other hand, the second EGR control valve 24 is arranged to be opened when the second solenoid valve 32 is opened and the positive pressure (supercharging pressure) is introduced into the second actuator 28.

The practices for controlling the first EGR control valve 22 and the second EGR control valve 24 are the same as in the first embodiment, so that description thereof will be omitted from the following description.

Further, the EGR gases cooled by the EGR cooler 25 are recirculated toward the upstream side of the inter cooler 51 of the intake system 3, thereby supplying the EGR gases having lower temperature to the internal combustion engine.

Figure 6:
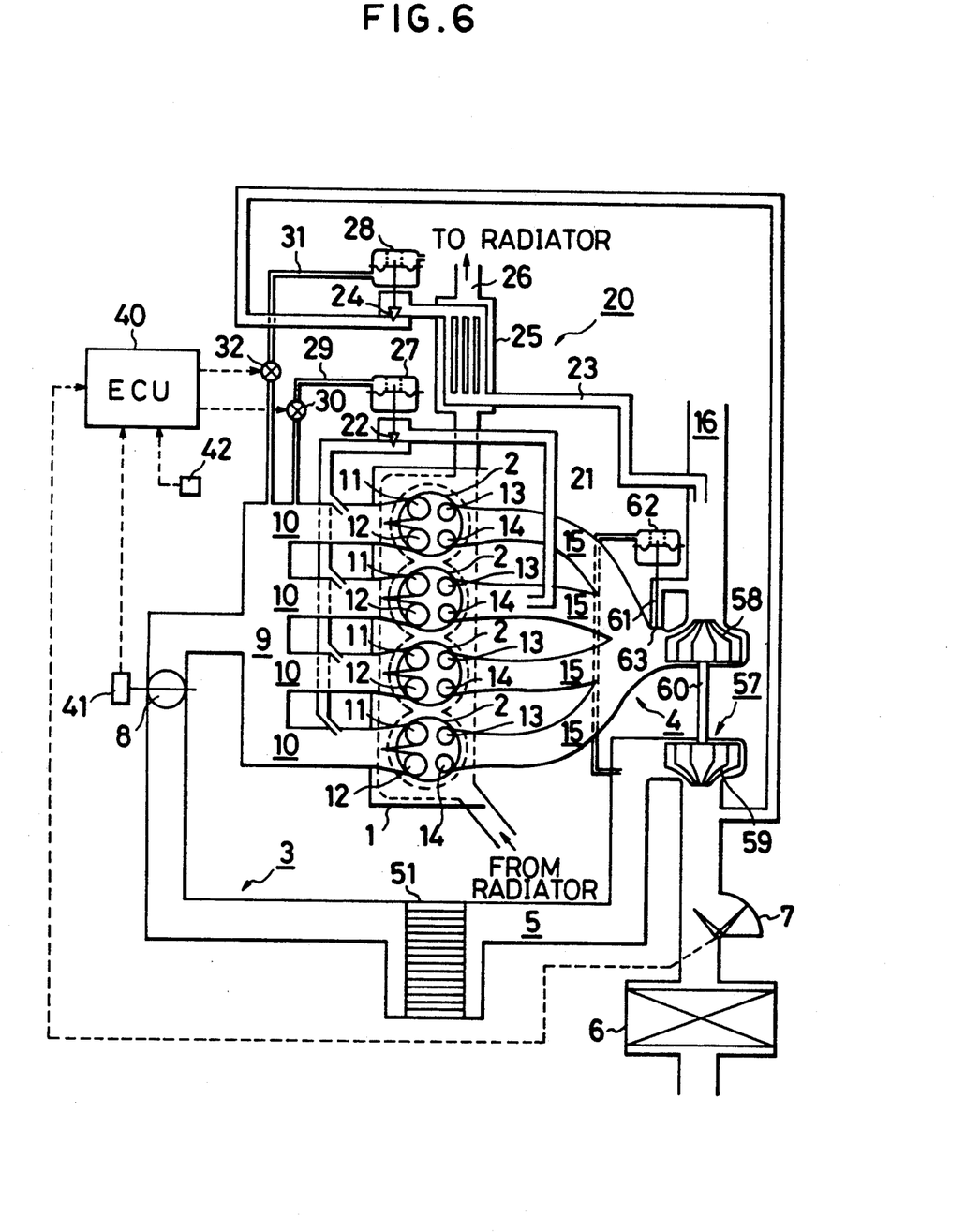
FIG. 6 is a schematic representation showing an outline of the internal combustion engine according to the third embodiment of the present invention.

THIRD EMBODIMENT (FIG. 6)

This embodiment according to the present invention is directed to the internal combustion engine with a turbo charger and the way of controlling the EGR as employed in the first embodiment is applied to this embodiment.

A turbo charger 57 comprises a turbine 58 disposed at the common exhaust passage 16, a supercharger 59 disposed at the common intake passage 5, and a connecting shaft 60 for connecting the turbine 58 to the supercharger 59.

The exhaust system 4 is provided with a bypass passage 61 bypassing the turbine 58, and the bypass passage 61 in turn is provided with a gate valve 63 drivable by an actuator 62 of a diaphragm type. A pressure chamber of the actuator 62 is communicated with the common intake passage 5 on the downstream side of the supercharger 59 and the gate valve 63 is opened to withdraw the exhaust gases when the supercharging pressure reaches a value higher than a predetermined value.

The EGR unit 20 has the first EGR duct 21 connected to the independent exhaust passage 15, thereby permitting the exhaust gases immediately after withdrawn from the EGR unit body to be introduced thereinto. The second EGR duct 23 is independent from the first EGR duct 21, and one end of the second EGR duct 23 is connected to the common exhaust passage 16 on the downstream side of the turbine 58 while the other end thereof is connected to the common intake passage 5 on the upstream side of the supercharger 59.

The first EGR control valve 22 is opened when the negative pressure of intake air is introduced into the first actuator 27, like in the first embodiment according to the present invention. The second EGR control valve 24 is opened when the supercharging pressure is introduced into the second actuator 28.

The practices for controlling the first EGR control valve 22 and the second EGR control valve 24 are the same as in the first embodiment, so that description thereof will be omitted from the following description.

In this embodiment, as described hereinabove, the first EGR duct 21 to be opened in the light load region is connected to the independent exhaust passage 15, thereby allowing the exhaust gases having high temperature, immediately after withdrawn from the engine body 1, to be recirculated into the intake system 3. This arrangement can suppress an increase in work of the supercharger 59 by the EGR gases having high temperature in the light load region, so that the speed of rotation of the supercharger 59 is increased and the turbine efficiency is elevated.

On the other hand, in the high load region, the exhaust gases having relatively low temperature is introduced into the second EGR duct 23, like in the second embodiment as described hereinabove, and the exhaust gases are then cooled by the EGR cooler 25, followed by recirculation into the intake system 3.

Hence, in the low-rotation and high-load region where particularly the knocking is likely to occur, this embodiment has the advantages that the EGR gases having low temperature prevents the knocking from occurring and the turbine efficiency from decreasing.

Figure 7:
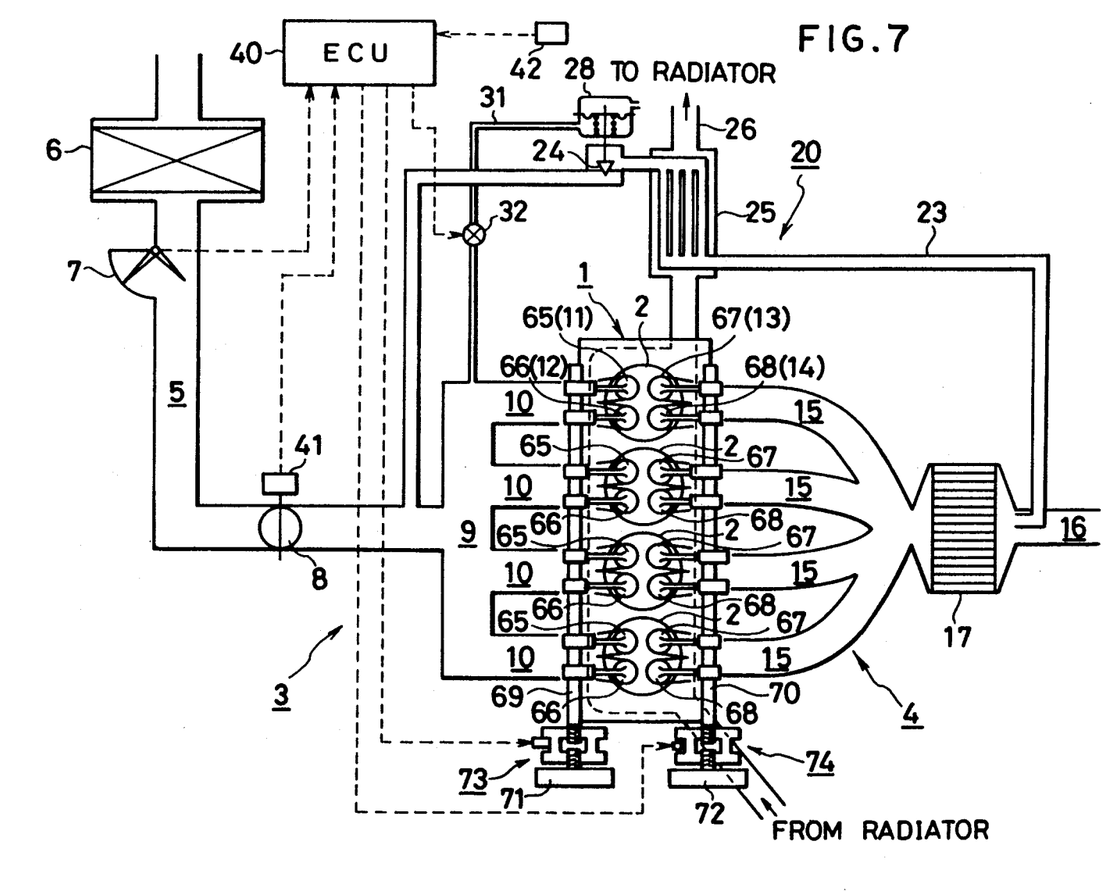
FIG. 7 is a schematic representation showing an outline of the internal combustion engine.
Figure 8:
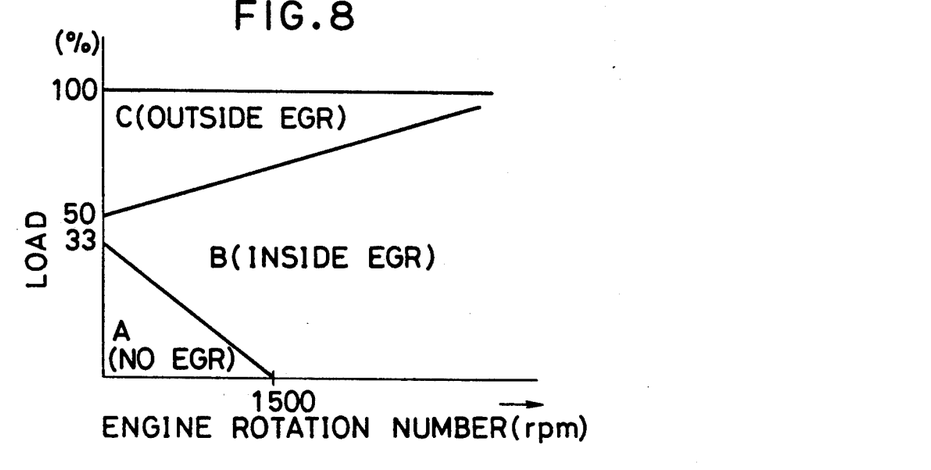
FIG. 8 is a control map to be employed for the control.
Figure 9:
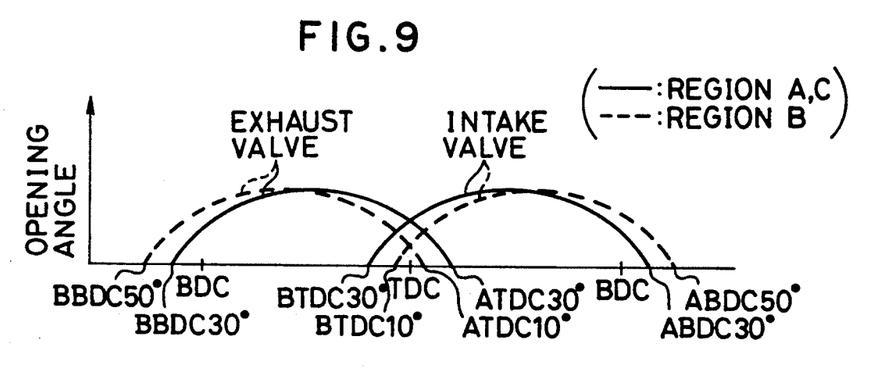
FIG. 9 is a graphic representation showing the valve timing.

FOURTH EMBODIMENT (FIGS. 7 TO 9)

In this embodiment, the engine body 1 is so arranged as to open or close two intake valves 65 and 66 as well as the exhaust valves 67 and 68, each disposed at each of the cylinders 2, through cam shafts 69 and 70 for exclusive use, respectively. More specifically, the cam shaft 69 is exclusive for use with the intake valves 65 and 66, while the cam shaft 70 is exclusive for use with the exhaust valves 67 and 68. The cam shafts 69 and 70 are accommodated in a cylinder head (not shown). In other words, the engine body 1 is a 4-valve DOHC type engine of a natural intake type, having the compression ratio of 12.5.

Mounted to the front portions of the cam shafts 69 and 70 are cam pulleys 71 and 72 disposed in association with the output shaft of the internal combustion engine and valve timing changing mechanisms 73 and 74, as known per se, respectively. The valve timing changing mechanism 73 is so arranged as to change the period of time during which the open state of the intake valve overlaps with the open state of the exhaust valve by changing the phase of the cam shaft 69 with respect to the cam pulley 71. Likewise, the valve timing changing mechanism 74 is so arranged as to change the period of time during which the open state of the intake valve overlaps with the open state of the exhaust valve by changing the phase of the cam shaft 70 with respect to the cam pulley 72.

It is to be noted herein that the period of time when the open state of the intake valve overlaps with the open state of the exhaust valve may be changed, for example, by means of two kinds of cams that vary a lift quantity with respect to the intake valve, in addition to the valve timing changing mechanisms 73 and 74.

In this embodiment, the EGR duct 20 has the second EGR duct 23 as an EGR passage for high load and no first EGR duct, as referred to as reference numeral 21 in the first embodiment, etc. is provided.

The control unit 40 is also arranged to control the valve timing, in addition to the control of the EGR control valve 24.

In a memory of the control unit 40 is stored a map, as shown in FIG. 8, in order to control the valve timing changing mechanisms 73 and 74 as well as the EGR control valve 24. The region A as indicated in FIG. 8 is a low-rotation and low-load region, the region B as indicated therein is a low-medium load region, and the region C as indicated therein is a high load region.

Region A (Low-Rotation and Low-Load Region)

The valve timing in the region A is as indicated by the broken line in FIG. 9. As is apparent from FIG. 9, the period of time where the open state of the intake valve 65 (66) overlaps with the open state of the exhaust valve 67 (68) is set shorter.

On the other hand, the EGR control valve 24 exists in a fully closed state.

It is preferred that the region A is arranged so as to ensure stability in combustion. Hence, the overlapping period of time is made shorter, thereby lessening residual gases (inside EGR) remained in the combustion chamber. And the EGR control valve 24 is brought into a fully closed state to block the outside EGR, thereby ensuring stability in combustion.

Region B (Low-Medium Load Region)

The valve timing in this region B is as indicated by the solid line in FIG. 9. As is apparent from FIG. 9, the overlapping period of time in the region B is set longer.

On the other hand, the EGR control valve 24 exists in a fully closed state.

In the region B where the problem with the pumping loss may arise, the overlapping period of time is set longer, thereby performing the inside exhaust gas recirculation (inside EGR) at high temperature by the residual gases. As described hereinabove, the inside EGR can reduce the pumping loss.

Region C (High Load Region)

The valve timing in this region C is as indicated by the broken line in FIG. 9. In the region C, as is shown in FIG. 9, the overlapping period of time is set shorter.

On the other hand, the EGR control valve 24 is opened, thereby permitting the outside exhaust gas recirculation (outside EGR) through the EGR duct 23. In the region C, the EGR gases which have been cooled during passage through the EGR duct 23 are recirculated into the intake system 3, thereby reducing the heat load of the engine body 1, and improving the anti-knocking performance, etc.

Figure 10:
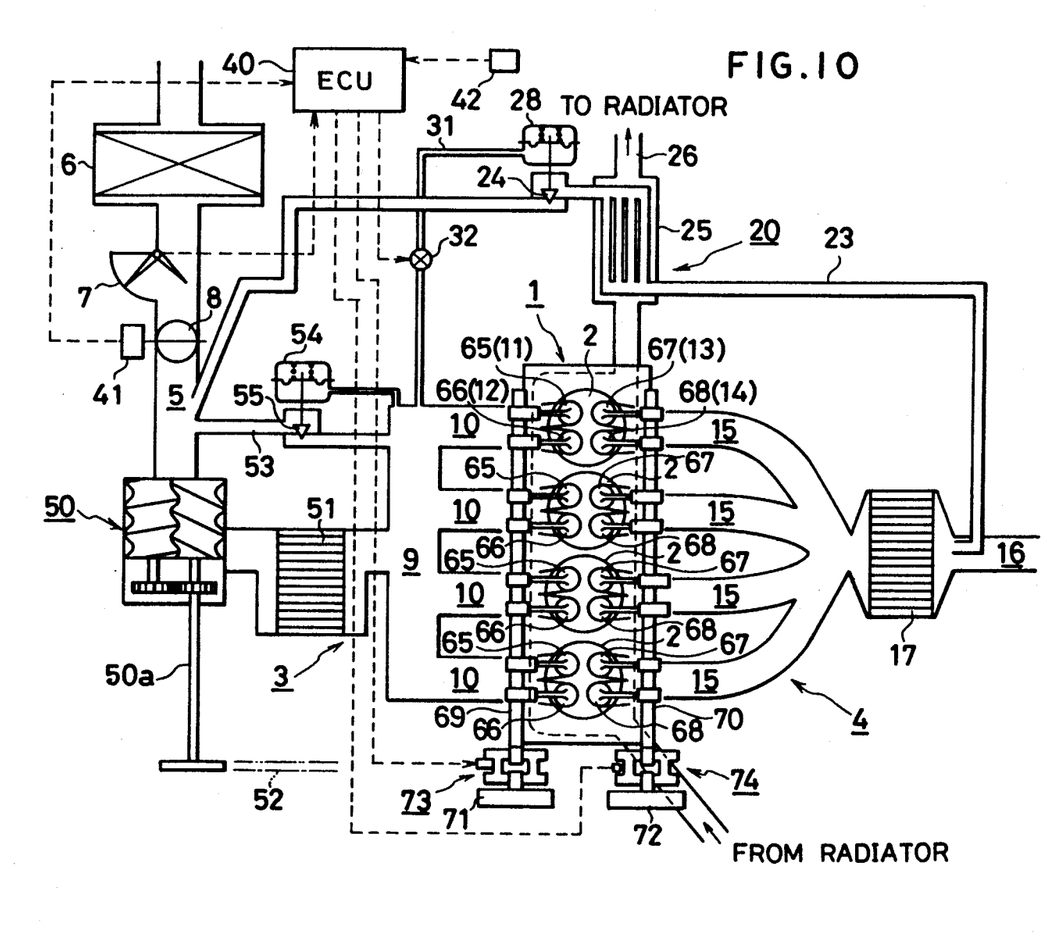
FIG. 10 is a schematic representation showing an outline of the internal combustion engine.
Figure 11:
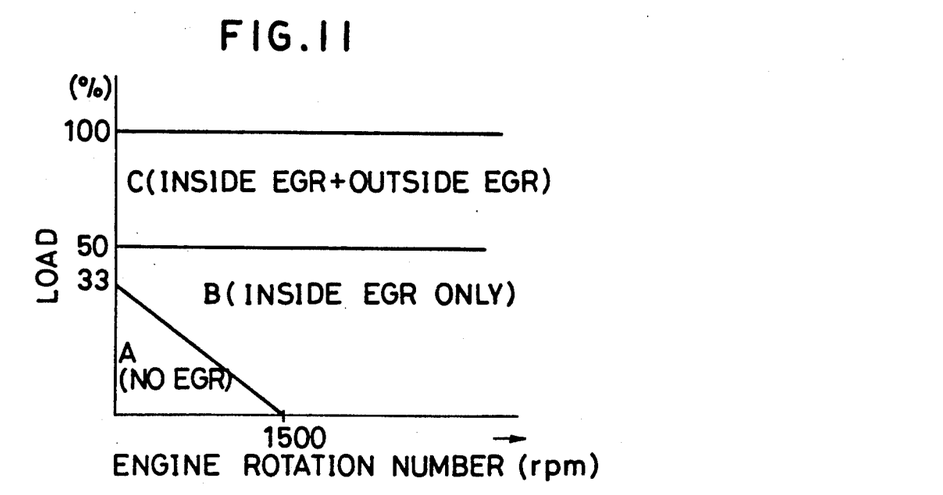
FIG. 11 is a control map to be employed for the control.

FIFTH EMBODIMENT (FIGS. 10 AND 11)

This embodiment according to the present invention is directed to an internal combustion engine with a supercharger of a mechanical type and the way of control as in the fourth embodiment is applied to this embodiment.

As shown in FIG. 10, the supercharger 50 of the mechanical type is provided, together with valve timing changing mechanisms 73 and 74. The internal combustion engine employed in this embodiment has the high compression ratio, for example, as high as 10.

Stored in the control unit 40 is a map as shown in FIG. 11, as well as the valve timing and the EGR are controlled in each of the regions A, B and C.

Region A (Low-Rotation and Low-Load)

In this region A, the overlapping period of time is set shorter like at the timing as indicated by the dashed line in FIG. 9.

On the other hand, the EGR control valve 24 exists in a fully closed state.

Region B (Low-Medium Load)

In the region B, the overlapping period of time is set longer like at the timing as indicated by the solid line in FIG. 9. On the other hand, the EGR control valve 24 is brought into a fully closed state. Hence, in this region B, the pumping loss can be reduced by means of the inside EGR having high temperature.

Region C (High Load)

In this region C, the overlapping period of time is set longer like at the timing as indicated by the solid line in FIG. 9. On the other hand, the EGR control valve 24 is opened, thereby permitting the outside EGR to be performed.

In other words, in the region C, the inside EGR and the outside EGR are both performed, thereby increasing the total quantity of EGR and improving the anti-knocking performance, etc.

Figure 12:
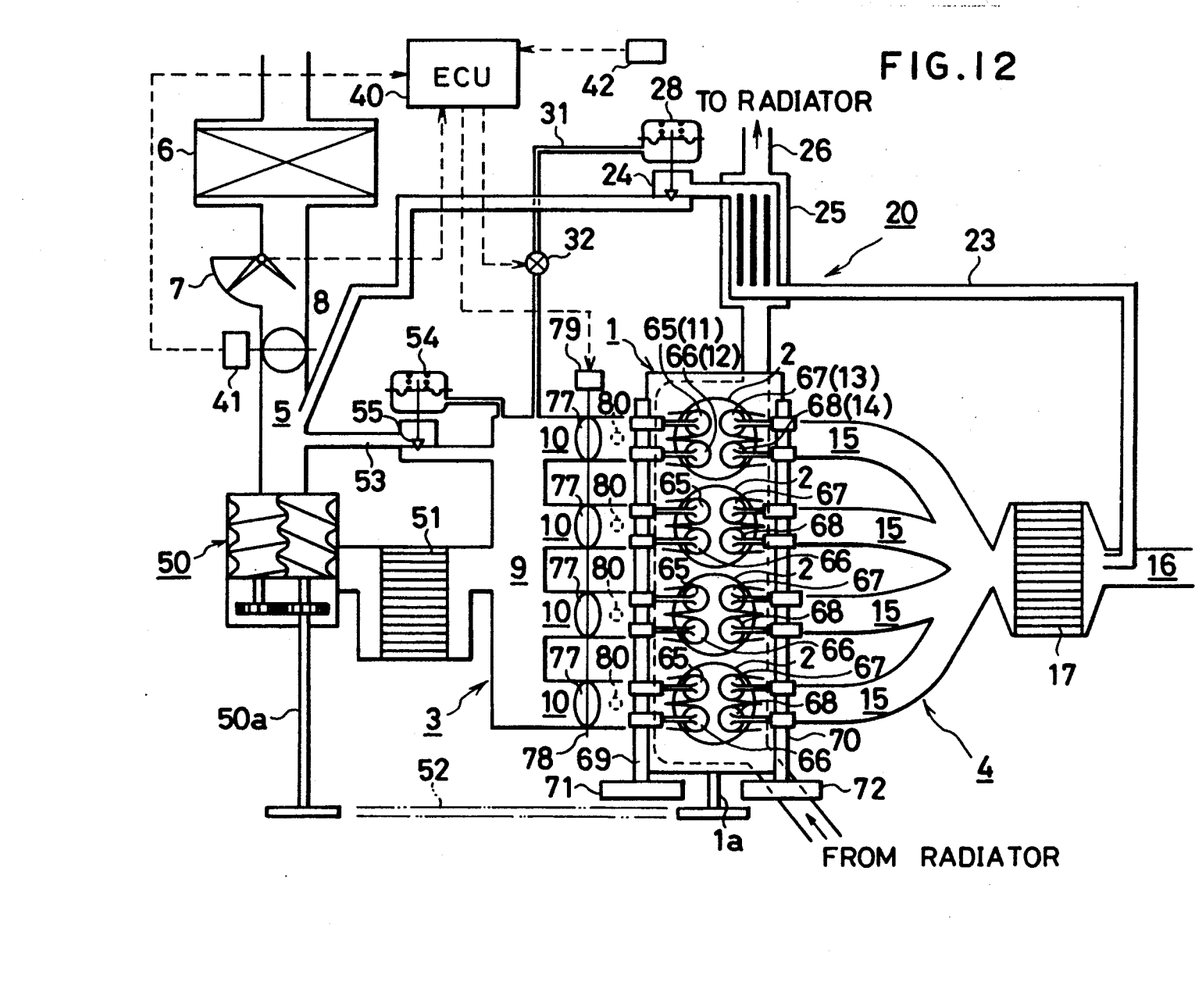
FIG. 12 is a schematic representation showing an outline of the internal combustion engine according to the sixth embodiment of the present invention.

SIXTH EMBODIMENT (FIG. 12)

This embodiment is a variant of the fifth embodiment according to the present invention.

The sixth embodiment of the present invention is directed to the structure of the exhaust gas recirculation system of the fifth embodiment from which the valve timing changing mechanisms 73 and 74 are excluded, yet which is provided with a second throttle valve 77 on each of the independent intake passages 10, in place of the valve timing changing mechanisms 73 and 74. Further, the timing at which each of the intake valves 65 and 66 is opened is put forward, thereby setting the overlapping period of time to be longer. The second throttle valve 77 is of a type of multiple string, which is mounted to a common shaft 78 one end of which is connected to an electrically drivable actuator 79. At each of the independent intake passages 10 on the downstream side of the throttle valve 77 is disposed a fuel injecting valve 80.

The control unit 40 generates control signals to the solenoid valve S2 to control the EGR control valve 24 and to the actuator 79 to control the second throttle valve 77. The control of the EGR control valve 24 and the throttle valve 77 is performed on the basis of a map of FIG. 11 as shown in FIG. 11.

Region A (Low-Rotation and Low-Load Region of FIG. 11)

The second throttle valve 77 is controlled to give an opening angle corresponding to the load, i.e. the opening angle of the first throttle valve 8, thereby suppressing a "back-blow" of intake air, i.e. a phenomenon of blowing the burned gases within the combustion chamber back into the intake system 3, and making the quantity of EGR small even if the large valve-overlapping period of time is set. In other words, the sixth embodiment can achieve the effect of the fifth embodiment where the valve timing is variable as indicated by the dashed line in FIG. 9, even if the valve timing changing mechanism is not provided.

On the other hand, the EGR control valve 24 exists in a fully closed state.

Region B (Low-Middle Region of FIG. 11)

The throttle valve 77 is maintained in its fully open state, thereby implementing the inside EGR for a long overlapping period of time in substantially the same manner as in the fifth embodiment in which the valve timing is variable as indicated by the solid line in FIG. 9.

On the other hand, the EGR control valve 24 exists in a fully closed state.

Hence, it can be noted that, in the region B, the pumping loss can be reduced by the inside EGR having high temperature.

Region C (High Load Region of FIG. 11)

In the region C, the throttle valve 77 is maintained in its fully open state as in the region B.

On the other hand, the EGR control valve 24 is opened to perform outside EGR.

Hence, the inside and outside EGR is to be performed in the region C, as in the fifth embodiment, thereby increasing the total quantity of EGR and improving the anti-knocking performance, etc.

Figure 13:
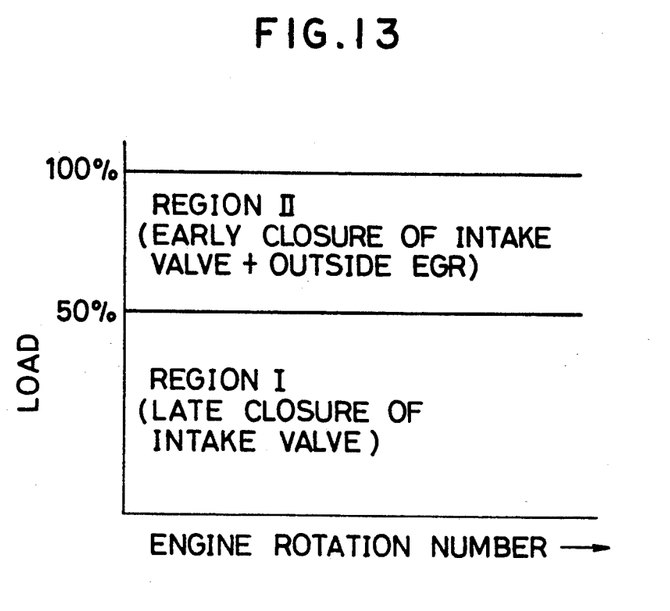
FIG. 13 is a control map to be employed for the control.
Figure 14:
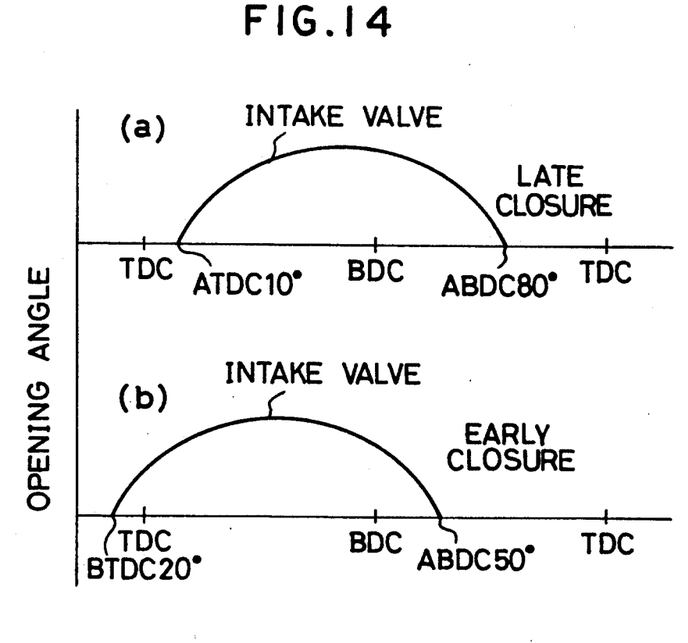
FIG. 14 is a graphic representation showing the valve timing.

SEVENTH EMBODIMENT (FIGS. 13 AND 14)

The overall configuration in this embodiment is identical to that in the fifth embodiment as shown in FIG. 10, in which the supercharger 50 of a mechanical type as well as the valve timing changing mechanisms 73 and 74 are provided. The compression ratio ($\epsilon$) is set to a high one, for example, as high as $\epsilon = 10$.

Stored in a memory of the control unit 40 is a map as shown in FIG. 13, in order to control the valve timing changing mechanism 73 and the EGR control valve 24 in agreement with the number of engine rotation and the load.

In the low load region I as shown in FIG. 13, the timing at which the intake valve 65 (66) is closed is delayed, i.e. so-called late closure is performed, as shown in FIG. 14(a). On the other hand, in the high load region II as shown in FIG. 13, the timing at which the intake valve 65 (66) is closed is put forward, i.e. so-called early closure is performed, as shown in FIG. 14(b).

Now, description will be made of the detail of the control in the low load region I and in the high load region II with reference to FIG. 13.

Low Load Region I

The timing of closing the intake valve 65 (66) is delayed, thereby performing the so-called late closure as shown in FIG. 14(a) to reduce the pumping loss.

On the other hand, the EGR control valve 14 exists in a closed state.

It is to be noted that the supercharged engine usually sets the compression ratio lower than the engine of a natural supply exhaust type does, in order to prevent knocking in the high load region. When the compression ratio is set low or when the closure of the intake valve is delayed in the low compression ratio, however, a decrease in stability of combustion in the low load region is caused. On the other hand, in this embodiment in which the engine to be employed is a supercharged engine, the compression ratio is set to be as high as, for example, $\epsilon$ TM 10, so that stability in combustion can be ensured in the low load region I while reducing the pumping loss.

High Load Region II

The timing of closing the intake valve 65 (66) is set to put forward the closure thereof, as shown in FIG. 14(b), thereby improving filling efficiency.

On the other hand, the EGR control valve 24 is opened to allow the EGR duct 24 to perform the outside EGR.

In other words, in the high load region II, the timing of closing the intake valve is put forward, in addition to the fact that the compression is set to be high, so that the anti-knocking performance may be decreased to a great extent. However, in this embodiment, the anti-knocking performance is ensured by supplying to the engine body 1 the EGR gases which have been cooled to lower temperature by first cooling the exhaust gases, lowered during passage of the catalyst converter, with the EGR cooler 25 and then recirculating the cooled EGR gases to the upstream side of the inter cooler 51.

In this embodiment, an EGR cooler of air cooled type may be employed, in place of the EGR cooler 25 of water cooled type, in the same manner as in the other embodiments. Further, the EGR duct 23 itself may be composed of a prolonged outside pipe, thereby allowing the EGR gases to be cooled with air, or it may be composed of plural parallel ducts, thereby allowing the EGR gases to be cooled.

While, in the embodiments as described hereinabove, a description has been made of the case where the present invention is embodied as described hereinabove, it is to be understood that the present invention is not limited to the particular embodiments. Various other changes, modifications and variations may be made within the spirit and scope of the present invention in a range as claimed in the appended claims with reference to the description of the embodiments and the accompanying drawings.

What is claimed is:

1. An exhaust gas recirculation system for an internal combustion engine having an outside exhaust gas recirculation duct connected to an exhaust system of the internal combustion engine and an intake system thereof for recirculating a portion of exhaust gases into the intake system, wherein:

said outside exhaust gas recirculating duct is provided with an exhaust gas recirculation cooler, said internal combustion engine is an engine having a high compression ratio and a supercharger disposed in the intake system and wherein said supercharger is of a mechanical type drivable by output of the engine.

2. An exhaust gas recirculation system for an internal combustion engine having an outside exhaust gas recirculation duct connected to an exhaust system of the internal combustion engine and an intake system thereof for recirculating a portion of exhaust gases into the intake system, wherein:

said outside exhaust gas recirculation duct is provided with an exhaust gas recirculation cooler, said internal combustion engine is an engine having a high compression ratio and a supercharger disposed in the intake system, said supercharger is a turbo charger of a type drivable by exhaust gases from the engine and wherein said outside exhaust gas recirculation duct is connected on the downstream side of a turbine of said turbo charger.

3. An exhaust gas recirculation system for an internal combustion engine having an outside exhaust gas recirculation duct connected to an exhaust system of the internal combustion engine and an intake system thereof for recirculating a portion of exhaust gases into the intake system, wherein:

said outside exhaust gas recirculation duct is provided with an exhaust gas recirculation cooler, said internal combustion engine is an engine having a high compression ratio, a supercharger disposed in the intake system and an inter cooler is disposed in the intake system of said engine on the downstream side of said supercharger and wherein said outside exhaust gas recirculation duct is connected on an upstream side of said inter cooler.

4. An exhaust gas recirculation system for an internal combustion engine, comprising:

means for changing a period of time for which an open state of an intake valve for the engine overlaps with an open state of an exhaust valve therefor;

an outside exhaust gas recirculation duct connected to an exhaust system of the engine and an intake system thereof for recirculating a portion of exhaust gases into the intake system thereof while forcibly cooling the portion of the exhaust gases;

an exhaust gas recirculation control valve disposed at said outside exhaust gas recirculation duct;

load detecting means for detecting a load of the engine;

control means for generating a control signal to said means for changing said period of time in response to a signal from said load detecting means so as to extend said period of time when the engine exists in a low-load driving state and so as to shorten said period of time when the engine exists in a high-load driving state; and exhaust gas recirculation controlling means for closing said exhaust gas recirculation control valve when the engine exists in the low-load driving state and for opening said exhaust gas recirculation control valve when the engine is in the high-load driving state, in response to a signal from said load detecting means.

5. An exhaust gas recirculation system as claimed in claim 4, wherein said engine is an engine having a high compression ratio.

6. An exhaust gas recirculation system as claimed in claim 4, wherein said outside exhaust gas recirculation duct is provided with an exhaust gas recirculation cooler.

7. An exhaust gas recirculation system as claimed in claim 4, wherein said outside exhaust gas recirculation duct is composed of plural pipes juxtaposed with each other.

8. An exhaust gas recirculation system for an internal combustion engine, comprising:
- a supercharger disposed at an intake system of the internal combustion engine;
- means for changing a period of time for which an open state of the intake system thereof overlaps with an open state of the exhaust system thereof;
- an outside exhaust gas recirculation duct connected to an intake system thereof and an exhaust system thereof for recirculating a portion of exhaust gases into the intake system thereof, while cooling forcibly;
- an exhaust gas recirculation control valve disposed at said outside exhaust gas recirculation duct;
- load detecting means for detecting a load of the engine;
- control means for generating a control signal to said means for changing said period of time in response to a signal from said load detecting means so as to shorten said period of time when the engine exists in an extremely low-load driving state and so as to extend said period of time when the engine exists in a light-load or high-load driving state; and
- exhaust gas recirculation controlling means for closing said exhaust gas recirculation control valve when the engine exists in the extremely low-load driving state or in the light-load driving state and for opening said exhaust gas recirculation control valve when the engine is in the high-load driving state, in response to a signal from said load detecting means.

9. An exhaust gas recirculation system as claimed in claim 8, wherein said engine is an engine having a high compression ratio.

10. An exhaust gas recirculation system as claimed in claim 8, wherein said outside exhaust gas recirculation duct is provided with an exhaust gas recirculation cooler.

11. An exhaust gas recirculation system as claimed in claim 8, wherein said outside exhaust gas recirculation duct is composed of plural pipes juxtaposed with each other.

12. An exhaust gas recirculation system for an internal combustion engine which is so arranged as to extend a period of time during which an open state of an intake valve overlaps with an open state of an exhaust valve by putting forward a timing at which the intake valve of the engine is opened, comprising:
- a second throttle valve disposed in the vicinity of an intake port of the engine;
- an actuator for driving said second throttle valve;
- an outside exhaust gas recirculation duct connected to the intake system thereof and the exhaust system thereof for recirculating a portion of exhaust gases while forcibly cooling into the intake system thereof;
- an exhaust gas recirculation control valve disposed at said outside exhaust gas recirculation duct;
- load detecting means for detecting a load of the engine;
- throttle valve controlling means for controlling said second throttle valve in a direction of closing said second throttle valve when the engine exists in an extremely low-load driving state and for opening said second throttle valve to a full extent when the engine exists in a light-load driving region or in a high-load driving state; and
- exhaust gas recirculation controlling means for closing said exhaust gas recirculation control valve when the engine exists in the extremely low-load driving state or in the light-load driving state and for opening said exhaust gas recirculation control valve when the engine is in the high-load driving state, in response to a signal from said load detecting means.

13. An exhaust gas recirculation system as claimed in claim 12, wherein said internal combustion engine is an engine having a supercharger disposed at the intake system thereof.

14. An exhaust gas recirculation system as claimed in claim 13, wherein said engine is an engine having a high compression ratio.

15. An exhaust gas recirculation system as claimed in claim 13, wherein said outside exhaust gas recirculation duct is provided with an exhaust gas recirculation cooler.

16. An exhaust gas recirculation system as claimed in claim 13, wherein said outside exhaust gas recirculation duct is composed of plural pipes juxtaposed with each other.

17. An exhaust gas recirculation system for an internal combustion engine, comprising:
- a mechanism for changing a timing at which an intake valve of the engine is closed;
- an outside exhaust gas recirculation duct connected to an intake system thereof and an exhaust system thereof for recirculating a portion of exhaust gases while forcibly cooling into the intake system thereof;
- an exhaust gas recirculation control valve disposed at said outside exhaust gas recirculation duct;
- load detecting means for detecting a load of the engine;
- control means for generating a control signal to said mechanism for changing said timing in response to a signal from said load detecting means so as to delay the timing of closing said intake valve when the engine exists in a low-load driving state and so as to put forward said timing of closing said intake valve when the engine exists in a high-load driving state; and
- exhaust gas recirculation controlling means for closing said exhaust gas recirculation control valve when the engine exists in the low-load driving state and for opening said exhaust gas recirculation control valve when the engine is in the high-load driving state, in response to a signal from said load detecting means.

18. An exhaust gas recirculation system as claimed in claim 17, wherein said internal combustion engine is an engine having a supercharger disposed at the intake system thereof.

19. An exhaust gas recirculation system as claimed in claim 18, wherein said engine is an engine having a high compression ratio.

20. An exhaust gas recirculation system as claimed in claim 18, wherein said outside exhaust gas recirculation duct is provided with an exhaust gas recirculation cooler.

21. An exhaust gas recirculation system as claimed in claim 18, wherein said outside exhaust gas recirculation duct is composed of plural pipes juxtaposed with each other.

22. An exhaust gas recirculation system for an internal combustion engine, comprising:
- a first outside exhaust gas recirculation duct connected to an exhaust system of the internal combustion engine and an intake system thereof for recirculating a portion of exhaust gases into the intake system thereof;
- a second outside exhaust gas recirculation duct connected to the exhaust system of the internal combustion engine and the intake system thereof for recirculating a portion of exhaust gases into the intake system thereof while forcibly cooling said portion of exhaust gases;
- a first exhaust gas recirculation control valve disposed at said first outside exhaust gas recirculation duct;
- a second exhaust gas recirculation control valve disposed at said second outside exhaust gas recirculation duct;
- load detecting means for detecting a load of the engine; and
- exhaust gas recirculation controlling means for controlling exhaust gas recirculation in a direction of closing said first exhaust gas recirculation control valve while in a direction of opening said second exhaust gas recirculation control valve in accordance with a magnitude of the load, in response to a signal from said load detecting means, when the engine exists in a high-load driving state.

23. An exhaust gas recirculation system as claimed in claim 22, wherein said second outside exhaust gas recirculation duct is provided with an exhaust gas recirculation cooler.

24. An exhaust gas recirculation system as claimed in claim 22, wherein said second outside exhaust gas recirculation duct has a duct length longer than said first outside exhaust gas recirculation duct.

25. An exhaust gas recirculation system as claimed in claim 22, wherein said second outside exhaust gas recirculation duct is composed of pipes juxtaposed with each other.

26. An exhaust gas recirculation system as claimed in claim 22, wherein:
- said first outside exhaust gas recirculation duct is connected to an upstream portion of said exhaust system; and
- said second outside exhaust gas recirculation duct is connected to a downstream portion of said exhaust system.

27. An exhaust gas recirculation system as claimed in claim 22, wherein said internal combustion engine is an engine having a supercharger disposed in the intake system.

28. An exhaust gas recirculation system as claimed in claim 27, wherein:
- an inter cooler is disposed at the intake system of said engine on the downstream side of said supercharger; and
- said second outside exhaust gas recirculation duct is connected on the upstream side of said inter cooler.

* * * * *